(12) United States Patent
Baker et al.

(10) Patent No.: US 7,831,271 B2
(45) Date of Patent: Nov. 9, 2010

(54) COMMUNICATION SYSTEM AND METHOD OF OPERATING THE COMMUNICATING SYSTEM

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1152 days.

(21) Appl. No.: 10/567,042

(22) PCT Filed: Aug. 4, 2004

(86) PCT No.: PCT/IB2004/002630

§ 371 (c)(1),
(2), (4) Date: Feb. 2, 2006

(87) PCT Pub. No.: WO2005/015768

PCT Pub. Date: Feb. 17, 2005

(65) Prior Publication Data

US 2008/0151840 A1  Jun. 26, 2008

(30) Foreign Application Priority Data

Aug. 11, 2003 (GB) .................. 0318735.8
May 14, 2004 (GB) .................. 0410905.4

(51) Int. Cl.
*H04B 7/00* (2006.01)
(52) U.S. Cl. .............. 455/522; 455/69; 370/318
(58) Field of Classification Search ......... 455/522, 455/69; 370/318, 335, 329
See application file for complete search history.

(56) References Cited

U.S. PATENT DOCUMENTS

| 5,794,129 A | 8/1998 | Komatsu |
| 6,064,659 A | 5/2000 | Rohani |
| 6,393,005 B1 * | 5/2002 | Mimura ..................... 370/335 |
| 2002/0118729 A1 * | 8/2002 | Lomp et al. ................ 375/146 |

FOREIGN PATENT DOCUMENTS

| EP | 0887947 A2 | 12/1998 |
| JP | 11074834 A | 3/1999 |
| JP | 4319682 A | 6/2009 |
| WO | WO/0062442 | * 10/2000 |

* cited by examiner

*Primary Examiner*—Nay A Maung
*Assistant Examiner*—Angelica M Perez

(57) ABSTRACT

A communication system, for example UMTS (Universal Mobile Telecommunication System), comprises a base station and a plurality of mobile stations. In normal operation the mobile station continuously makes uplink transmissions on certain spread spectrum channels (DPDCH, DPCCH). The maximum allowed power (Pmax) for these uplink transmissions is specified. However there are occasions when for example receiving packet data from the base station, the receiving mobile station has to transmit an acknowledgement (ACK) or a Non-acknowledgement (NACK) at a power level specified by the base station. In order to keep the transmit power of the mobile station within the maximum allowed power, the total power required to transmit an ACK or NACK in parallel with the continuous uplink signals is determined and if this exceeds Pmax then at least the power DPDCH and DPCCH channels are scaled to allow sufficient power for the transmission of an ACK or NACK. The power scaling is carried-out based on the power required for whichever one of ACK or NACK requires the most power. This avoids reducing the amount of time available to a mobile whether an ACK or NACK should be transmitted.

9 Claims, 3 Drawing Sheets

COMMUNICATION SYSTEM AND METHOD OF OPERATING THE COMMUNICATING SYSTEM

The present invention relates to a communication system, to a station for use in a communication system, and to a method of operating a communication system. The present invention has particular, but not exclusive, application to spread spectrum systems such as UMTS (Universal Mobile Telecommunication System).

Terminals in mobile communication systems usually have a maximum transmit power limit, which may be set by physical constraints or in response to an instruction received from a controller.

In a communication system while a terminal is transmitting a first signal, it is sometimes necessary to transmit simultaneously additional signals which would require the terminal's maximum transmit power limit to be exceeded. In such cases, a variety of approaches may be taken, including reducing the transmit power of the first signal in order to allow sufficient power for the additional signal(s) to be transmitted without breaching the maximum power limit or switching-off part or all of the first signal in order to allow the additional signal(s) to be transmitted.

In some systems, it is only possible to execute the reduction in transmit power of the first signal at particular time instants, such as a frame- or timeslot-boundary. These time instants may not correspond to the times at which the transmission of the additional signal(s) must commence. A method of overcoming this problem is to execute a reduction in transmit power in advance of the transmission of the additional signal(s).

In such situations, the exact nature of the additional signal(s) may not yet be known at the time when the reduction in transmit power of the first signal has to be executed because, for example, there is insufficient time for the terminal to evaluate a critical feature, such as a CRC (cyclic redundancy check) in a received signal. Different types of additional signal may have different transmit power requirements.

An object of the present invention is to be able to transmit an additional signal in a timely manner whilst not exceeding a predetermined maximum power limit.

According to a first aspect of the present invention there is provided a method of operating a communication system comprising a first station and a second station, the first and second stations each having transceiving means, the second station transmitting a first signal to the first station, the power of the transmitted first signal not exceeding a predetermined maximum level, wherein in response to the second station wishing to transmit any one of a set of possible additional signals, the transmit power of the first signal is scaled by an amount which takes into account the greater (or greatest) power requirement of all of the set of the possible additional signals to be transmitted subsequently.

According to a second aspect of the present invention there is provided a communication system comprising a first station and a second station, the first station and second stations having transceiving means, the second station having power control means for controlling the transmitted power level of a first signal to be transmitted to the first station, wherein the power control means is adapted, in response to determining that the second station wishes to transmit any one of a set of possible additional signals simultaneously with the first signals, to scale the transmit power of the first signal by an amount which takes into account the greater (or greatest) power requirement of all of the set of the possible additional signals to be transmitted subsequently.

According to a third aspect of the present invention there is provided a second station for use in a communication system comprising a first station and a second station, the second station including transceiving means for communication with the first station, and power control means for controlling the transmitted power level of a first signal to be transmitted to the first station, wherein the power control means is adapted, in response to determining that the second station wishes to transmit any one of a set of possible additional signals simultaneously with the first signals, to scale the transmit power of the first signal by an amount which takes into account the greater (or greatest) power requirement of all of the set of the possible additional signals to be transmitted subsequently.

The method in accordance with the present invention avoids setting a requirement on the terminal to make an earlier decision about which type of additional signal is to be transmitted, or to make a reduction in power of the first signal at some time other than the most convenient or required instant.

The present invention will now be described, by way of example, with reference to the accompanying drawings, wherein.

In the drawings the same reference numbers have been used to indicate corresponding features.

Figure 1:
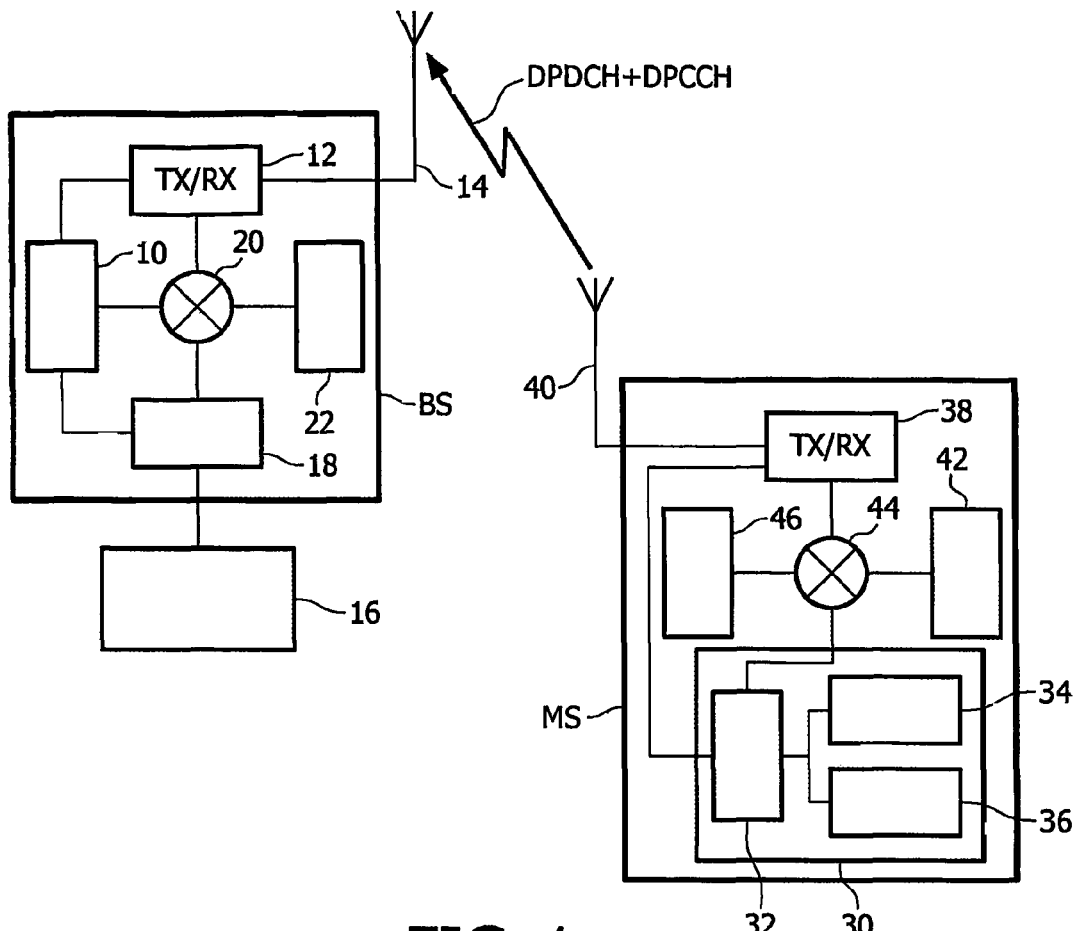
FIG. 1 is a block schematic diagram of an UMTS communication system.

The UMTS communication system comprises at least one base station BS and a plurality of mobile stations MS, one of which is shown in FIG. 1. The mobile stations are able to roam within the radio coverage of the base station(s) and maintain radio communication by way of spread spectrum signalling on downlinks from the base station(s) and uplinks from the mobile stations. As is customary with spread spectrum signalling several signals can be transmitted simultaneously each signal having its own signature or spreading code selected from a set of signatures. Additionally power control has to be effected to prevent weaker signals being swamped by more powerful signals. Accordingly a base station can specify the maximum power at which a mobile station can transmit on the uplink.

Referring to FIG. 1, the base station BS is controlled by a controller 10 which carries out the many functions involved in the maintenance of the system and the sending and receiving of signals. A transceiver 12 is coupled to an antenna 14 for the transmission and reception of spread spectrum signals. An external source of data 16 is coupled to a base band stage 18 in which data is formatted into packets. The data packets are prepared for transmission by multiplying them in a multiplier 20 with a signature, for example a pseudo random code, obtained from a code store 22 under the control of the controller 10. The spread spectrum signal is passed to the transceiver for modulation and transmission.

In the case of a signal received at the antenna it is demodulated and despread by multiplying the demodulated signal with the appropriate signature. Thereafter the despread signal is passed to the base band stage 18.

The mobile station MS is controlled by a controller 30 which carries out the many functions involved in the operation of the mobile station, including the sending and receiving of signals. For convenience of illustration and to facilitate an understanding of the present invention the controller 30 is shown as comprising a microprocessor 32, a transmit power controller 34 and a power scaler 36. A transceiver 38 is coupled to an antenna 40 for the transmission and reception of spread spectrum signals from the base station BS. A man/machine interface 42, which includes a base band data formatting and deformatting stage, means for inputting data and means for outputting data, is coupled to a multiplier 44 to which is supplied a signature, for example a pseudo random code, obtained from a code store 46 under the control of the microprocessor 32. A signal to be transmitted on the uplink is spread and is passed to the transceiver 38 for modulation and transmission.

In the case of a downlink signal received at the antenna 40 it is demodulated and despread by multiplying the demodulated signal with the appropriate signature. Thereafter the despread signal is passed to the man/machine interface 42.

In the case of UMTS the operating standard requires each mobile station to transmit spread spectrum uplink signals substantially continuously. These signals are formatted into successive frames or time slots whose duration is specified by the system. Two signals are often transmitted continuously and these are a dedicated physical data channel DPDCH and dedicated physical control channel DPCCH, these signals are shown in FIG. 1. Only DPCCH is transmitted when there is no data. The relative transmission power levels $P_D$ and $P_C$ of the DPDCH and DPCCH channels are regulated so as to maintain a fixed power ratio for a given data type and their combined powers are controlled so as not to exceed an allowable maximum power level $P_{max}$. Further while maintaining the fixed power ratio, the power level $P_C$ of the DPCCH is adjusted periodically by a closed-loop power control mechanism.

Figure 2:
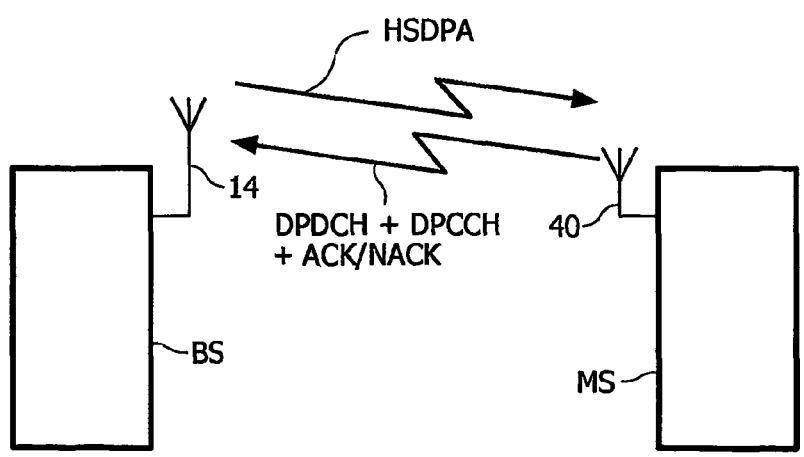
FIG. 2 is a simplified block schematic diagram illustrating the downlink and uplink signals.

Referring to FIG. 2, which is a simplified version of FIG. 1, from time to time the base station BS uses the downlink to transmit packet data to an identified mobile station using High-Speed Downlink Packet Access HSDPA. Under the UMTS standard, the mobile station MS must transmit a positive (ACK) or negative (NACK) acknowledgement for each HSDPA packet received, depending for example on the outcome of a cyclic redundancy check (CRC) evaluation.

Figure 3:
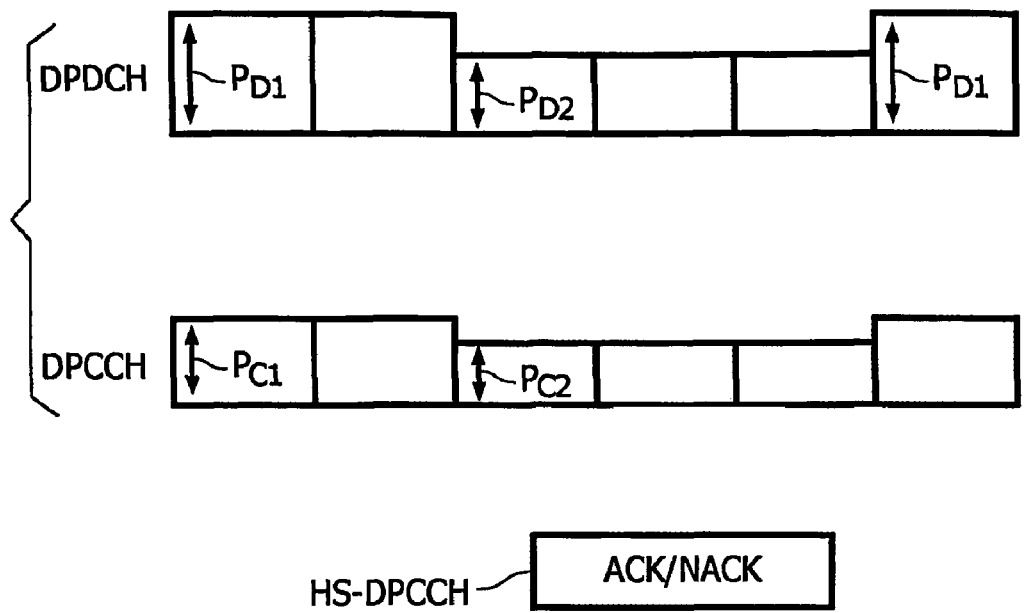
FIG. 3 is a timing diagram showing individually the uplink signals.

Referring to FIG. 3 the ACKs and NACKs are transmitted as spread spectrum signals on a so-called High-Speed Dedicated Physical Control Channel (HS-DPCCH), whose time slots are not aligned with the time slots on the other uplink channels carrying the continuous uplink signals DPDCH and DPCCH. The relative transmit powers of the ACKs and NACKs are different and the respective transmit powers are determined by the base station BS and notified to the mobile station MS.

If the transmission of an ACK or NACK in parallel with the continuous uplink signals would require more transmit power than is allowed, the transmit power must be reduced. If the adjustment of the respective signal powers is delayed until the CRC in the HSDPA packet is evaluated, in the case of a large packet it would be difficult, if not impossible, to make the adjustment at a DPCCH slot boundary as specified in the UMTS standard.

To avoid this problem the method in accordance with the present invention causes the transmit power of the other uplink channels, that is, the DPDCH and DPCCH, to be reduced at the timeslot boundary immediately preceding the start of the ACK or NACK transmission. However, as mentioned above, the transmit power for ACKs is required to be different from the transmit power for NACKs. Consequently, if the mobile station MS was to know by how much to reduce the power of the continuous signals DPDCH and DPCCH in time for the slot boundary prior to the start of the ACK or NACK transmission, it would need to complete the CRC evaluation process more quickly than the time allowed by the timing of the ACK/NACK transmission. Since this is not possible, the mobile station MS reduces the transmit power at the time slot prior to the start of the ACK/NACK transmission by an amount corresponding to whichever of ACK or NACK has the higher power requirement $P_A$ or $P_N$, respectively. In this way, the mobile station MS can ensure that enough transmit power is available for the ACK/NACK transmission regardless of the final outcome of the CRC evaluation process.

Figure 4:
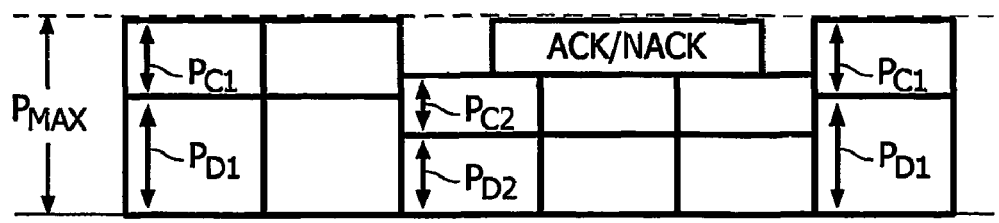
FIG. 4 is a timing diagram showing the combination of the uplink signals.

The principle is illustrated in FIGS. 3 and 4. In FIG. 3 the mobile station MS is initially transmitting at its maximum allowed power, $P_{max}=P_{C1}+P_{D1}$.

Suppose that $P_A$ is defined to be $2P_C$ and $P_N$ is defined to be equal to $P_C$.

Then the powers of the DPDCH and DPCCH must be reduced to $P_{D2}$ and $P_{C2}$, respectively, such that $$P_{C2}+P_{D2}+P_A=P_{max}$$

That is, $P_{C2}+P_{D2}+2P_{C2}=P_{max}$.

The power ratio between the control and data channels is maintained, such that $P_{D2}/P_{C2}=P_{D1}/P_{C1}$.

$$\text{Thus } P_{C2} = \frac{P_{C1}+P_{D1}-P_A}{1+P_{D1}/P_{C1}} \text{ or } P_{C2} = \frac{P_{C1}+P_{D1}}{3+P_{D1}/P_{C1}}$$

$$\text{and } P_{D2} = \frac{P_{C1}+P_{D1}-P_A}{1+P_{C1}/P_{D1}} \text{ or } P_{D2} = \frac{P_{C1}+P_{D1}}{1+3P_{C1}/P_{D1}}.$$

In FIG. 4 the broken horizontal line illustrates the maximum allowed transmit power $P_{max}$. When there is not ACK or NACK to be transmitted then the combined maximum amplitudes of $P_{D1}$ and $P_{C1}$ equal $P_{max}$. However at the boundary of the frame or time slot immediately preceding the sending of an ACK or NACK, these amplitudes are adjusted by for example reducing DPCCH whilst maintaining the power ratio $P_D/P_C$ constant. Thus capacity is left for the transmission of the higher power one of ACK or NACK, even though the lower power one may be transmitted thereby making the combined transmit power lower than $P_{max}$.

Figure 5:
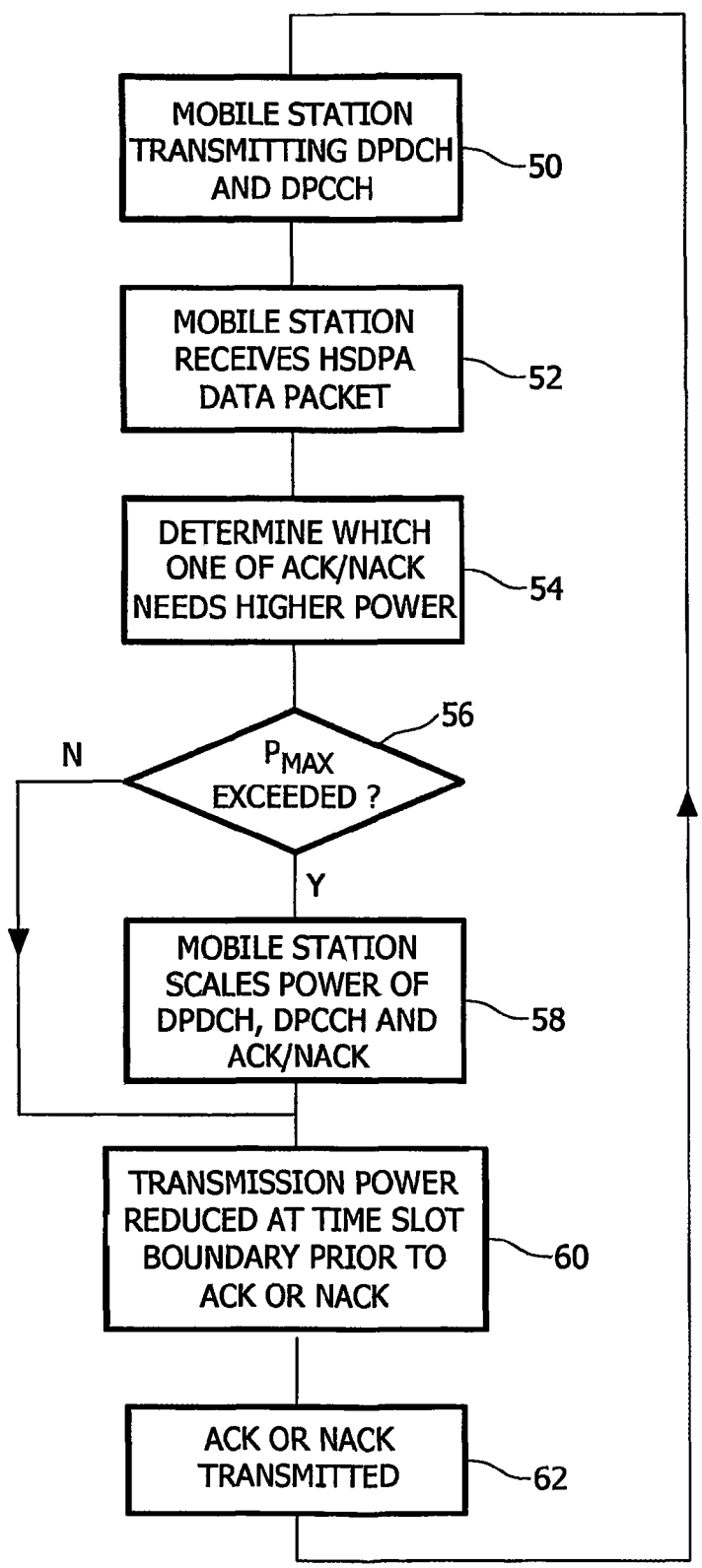
FIG. 5 is a flow chart illustrating an embodiment of the method in accordance with the present invention.

The flow chart shown in FIG. 5 summarises the operations carried out by the secondary station in implementing the method in accordance with the present invention. Block 50 relates to the mobile station MS continuously transmitting the DPDCH and DPCCH signals at a combined transmit power level equal to or less than the maximum allowable power level $P_{max}$. Block 52 relates to the mobile station receiving packet data in a downlink HSDPA packet data signal. Block 54 denotes the mobile station determining the power levels for the ACK or NACK signal and the greater one of the two levels. Block 56 denotes checking if $P_{max}$ would be exceeded by an uplink signal comprising DPDCH, DPCCH and the higher power of the ACK or NACK signals. If the answer is yes (Y) then in block 58 the scaling stage 36 (FIG. 1) of the mobile station scales the power of at least the DPCCH channel so that $P_{max}$ will not be exceeded. The flow chart proceeds to block 60. If the answer in the block 56 is no (N) the flow chart proceeds to the block 60. The block 60 denotes the power control stage 34 (FIG. 1) of the mobile station reducing the power of the DPDCH and DPCCH channels at the frame or time slot boundary preceding the transmission of the ACK or NACK. Block 62 relates to the mobile station MS transmitting the ACK or NACK.

When implementing the method in accordance with the present invention the scaling of the DPCCH power may coincide with a requested power increase, for example due to a closed loop power control process or a change in data format on the DPDCH. In this case, the result of the scaling process in accordance with the present invention may in fact be to increase the DPCCH (+DPDCH) transmit power, but by a smaller amount than was requested by the closed loop power control process and/or change in DPDCH data format. This situation may arise where the sum of $P_{C1}$ and $P_{D1}$ is less than $P_{max}$, but the sum of $P_{C2}+P_{D2}+$ the greater of $P_A$ and $P_N$ would be greater than $P_{max}$ if the scaling were not applied.

In another embodiment, the additional signals may carry information other than ACK/NACK signalling; for example, they may carry packet data (as in the proposed enhanced uplink in UMTS) or other signalling information.

In a further non-illustrated embodiment the base station may be required to implement the method in accordance with the present invention rather than the mobile station.

Although the method in accordance with the present invention has been described with reference to a spread spectrum communication system, its teachings may be applied to other systems having transmitter power control.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of telecommunication systems and component parts therefor and which may be used instead of or in addition to features already described herein.

The invention claimed is:

1. A method of operating a communication station (MS) adapted to transmit a plurality of signals simultaneously at respective power levels, the method comprising:
   transmitting one or more first signals (DPCCH, DPDCH) simultaneously at a specified maximum combined transmit power level ($P_{max}$);
   wherein, in response to a received signal, reducing the transmit power of the one or more first signals (DPCCH, DPDCH) and transmitting simultaneously with the one or more first signals (DPCCH, DPDCH) an additional one of a second signal (ACK or NACK) at a respective second specified power level ($P_A$ or $P_N$) and a third signal (NACK or ACK) at a respective third specified power level ($P_N$ or $P_A$), wherein the second specified power level ($P_A$ or $P_N$) exceeds the third specified power level ($P_N$ or $P_A$); wherein the reduction in transmit power of the one or more first signals (DPCCH, DPDCH) corresponds to the second specified power level ($P_A$ or $P_N$) irrespective of whether the additional signal is the second signal (ACK or NACK) or the third signal (NACK or ACK), such that when the additional signal is the third signal (NACK or ACK) the combined transmit power level is less than the specified maximum combined transmit power level ($P_{max}$).

2. A method of operating a communication station (MS) as claimed in claim 1 wherein the one or more first signals (DPCCH, DPDCH) are transmitted in first frames or time slots and the additional signals are transmitted in second frames or time slots, wherein the boundaries between the first frames or time slots are not coincident with the boundaries between the second frames or time slots, wherein the reduction in transmit power of the one or more first signals (DPCCH, DPDCH) commences at the first frame or time slot boundary immediately preceding the transmission of the additional signal.

3. A method of operating a communication station (MS) as claimed in claim 1, wherein the second signal (ACK or NACK) is a positive acknowledgement and the third signal (NACK or ACK) is a negative acknowledgement.

4. A method of operating a communication station (MS) as claimed in claim 1, wherein the signals are spread spectrum signals.

5. A communication station (MS) adapted to transmit a plurality of signals simultaneously at respective power levels, comprising:
   transceiver means (38) for transmitting one or more first signals (DPCCH, DPDCH) simultaneously at a specified maximum combined transmit power level ($P_{max}$), for receiving signals, and for, in response to a received signal, transmitting simultaneously with the one or more first signals (DPCCH, DPDCH) an additional one of a second signal (ACK or NACK) and a third signal (NACK or ACK);
   control means (30) for controlling the transmitted power level of the one or more first signals (DPCCH, DPDCH) and the additional signal (ACK, NACK);
   wherein the control means (34) is adapted to, in response to the received signal, reduce the transmit power of the one or more first signals (DPCCH, DPDCH) and to set the transmit power of the additional signal, if the additional signal is the second signal (ACK or NACK), to a respective second specified power level ($P_A$ or $P_N$) and, if the additional signal is the third signal (NACK or ACK), to a respective third specified power level ($P_N$ or $P_A$), wherein the second specified power level ($P_A$ or $P_N$) exceeds the third specified power level ($P_N$ or $P_A$); wherein the reduction in transmit power of the one or more first signals (DPCCH, DPDCH) corresponds to the second specified power level ($P_A$ or $P_A$) irrespective of whether the additional signal is the second signal (ACK or NACK) or the third signal (NACK or ACK), such that when the additional signal is the third signal (NACK or ACK) the combined transmit power level is less than the specified maximum combined transmit power (Pmax).

6. A communication station (MS) as claimed in claim 5 wherein the control means (34) is adapted to transmit the one or more first signals (DPCCH, DPDCH) in first frames or time slots and to transmit the additional signals in second frames or time slots, wherein the boundaries between the first frames or time slots are not coincident with the boundaries between the second frames or time slots, wherein the reduction in transmit power of the one or more first signals (DPCCH, DPDCH) commences at the first frame or time slot boundary immediately preceding the transmission of the additional signal.

7. A communication station (MS) as claimed in claim 5 wherein the second signal (ACK or NACK) is a positive acknowledgement and the third signal (NACK or ACK) is a negative acknowledgement.

8. A communication station (MS) as claimed in claim 5 wherein the signals are spread spectrum signals.

9. A communication system comprising a communication station (MS) as claimed in claim 5 and another station (BS) having a transceiver for communication with the communication station (MS).

* * * * *